United States Patent
Mertins

(10) Patent No.: US 10,866,011 B2
(45) Date of Patent: Dec. 15, 2020

(54) SUPPORT FOR SOLAR MODULES

(71) Applicant: FRENELL GmbH, Karlsruhe (DE)

(72) Inventor: Max Mertins, Freiburg (DE)

(73) Assignee: FRENELL GmbH, Karlsruhe (DE)

( * ) Notice: Subject to any disclaimer, the term of this patent is extended or adjusted under 35 U.S.C. 154(b) by 0 days.

(21) Appl. No.: 16/654,093

(22) Filed: Oct. 16, 2019

(65) Prior Publication Data

US 2020/0124323 A1    Apr. 23, 2020

(30) Foreign Application Priority Data

Oct. 17, 2018    (DE) ............... 20 2018 105 951 U

(51) Int. Cl.
| | |
|---|---|
| *F24S 23/70* | (2018.01) |
| *F24S 23/77* | (2018.01) |
| *F24S 30/40* | (2018.01) |
| *F24S 30/00* | (2018.01) |
| *F16C 17/00* | (2006.01) |
| *F16C 13/00* | (2006.01) |
| *H02S 20/32* | (2014.01) |
| *F24S 50/20* | (2018.01) |

(52) U.S. Cl.
CPC ............ *F24S 23/82* (2018.05); *F16C 13/00* (2013.01); *F16C 17/00* (2013.01); *F24S 23/77* (2018.05); *F24S 30/00* (2018.05); *F24S 30/40* (2018.05); *F24S 50/20* (2018.05); *H02S 20/32* (2014.12); *F24S 2030/15* (2018.05)

(58) Field of Classification Search
CPC .. F24S 23/82; F24S 23/77; F24S 30/40; F24S 2030/15; F24S 30/00; F24S 50/20; Y02E 10/50; Y02E 10/47; H02S 20/32; F16C 17/00; F16C 13/00

USPC .......... 60/641.8–641.15; 126/600, 605, 608
See application file for complete search history.

(56) References Cited

U.S. PATENT DOCUMENTS

| | | | | |
|---|---|---|---|---|
| 2009/0272375 | A1* | 11/2009 | Pedretti ................. | F24S 20/20 126/696 |
| 2010/0043776 | A1* | 2/2010 | Gee ....................... | F24S 30/42 126/571 |
| 2010/0071683 | A1* | 3/2010 | Selig ..................... | F24S 50/20 126/605 |
| 2012/0006212 | A1* | 1/2012 | Demand .............. | B26D 7/265 101/25 |
| 2015/0107580 | A1 | 4/2015 | Weber et al. | |
| 2018/0029831 | A1* | 2/2018 | Renvall ................ | F16M 13/02 |

FOREIGN PATENT DOCUMENTS

| | | |
|---|---|---|
| EP | 1 754 942 A1 | 2/2007 |
| EP | 1 754 942 B1 | 5/2011 |
| ES | 1 140 632 U | 6/2015 |
| ES | 2 587 409 A1 | 10/2016 |
| WO | 01/53710 A1 | 7/2001 |

* cited by examiner

*Primary Examiner* — Hoang M Nguyen
(74) *Attorney, Agent, or Firm* — Collard & Roe, P.C.

(57) ABSTRACT

A support for rotationally movable mounting of solar modules configures an outer shaft as a tube and mounts an inner shaft in it, by way of a calotte element in the end position, so that this element is accommodated in the outer shaft in longitudinally displaceable and tiltable manner, as well as in freely rotational manner, if necessary. In this way, only one roller block is required, even if two uncoupled connection shafts are to be mounted.

10 Claims, 2 Drawing Sheets

SUPPORT FOR SOLAR MODULES

CROSS REFERENCE TO RELATED APPLICATIONS

Applicant claims priority under 35 U.S.C. § 119 of German Application No. 20 2018 105 951.3 filed Oct. 17, 2018, the disclosure of which is incorporated by reference.

BACKGROUND OF THE INVENTION

1. Field of the Invention

The present invention relates to a support for rotationally movable mounting of solar modules in solar power plants, comprising a roller block and a connection shaft mounted on it for connecting two adjacent solar modules.

2. Description of the Related Art

Such a support is known from the state of the art. Thus, EP 1 754 942 B1 shows a primary mirror support having a roller block, in which a connection shaft is mounted. The rollers, which are mounted next to one another in a trough profile, jointly serve as a mounting for the connection shaft, which contacts both of them and is thus held in a defined position. For security, a third roller is laid onto the connection shaft from above, using a bracket.

Such a support serves to connect two primary mirrors that are coupled with one another by way of the connection shaft. As a result, it is sufficient to have one of the primary mirrors track the sun, using a motor, so that the subsequent primary mirrors, which are rigidly coupled with it, follow this mirror. In other cases, however, it is also known to guide the mirrors individually or at least to undertake a division into multiple mirror groups, which are uncoupled from one another. For this purpose, it is necessary, according to the state of the art, to provide two independent roller blocks for the separate connection shafts and thereby to keep a special construction available for these cases.

Furthermore, although it has already been provided, in the state of the art, to also pass the connection shaft through the roller block at an incline if a corresponding gradient is present, nevertheless a precisely linear orientation of the primary mirrors relative to one another is always required.

SUMMARY OF THE INVENTION

Against this background, it is an object of the present invention to provide a simpler but nevertheless more flexible solution for a support for solar modules, in particular primary mirrors or photovoltaic elements, which support not only does without a special construction in the region of uncoupled solar modules that contact one another, but also can bridge a gradient between them.

These and other objects are achieved by a support for rotationally movable mounting of solar modules in solar power plants in accordance with the characteristics of the invention. Practical embodiments of such a support can be derived from the discussion below.

According to the invention, it is provided that a support for a solar module makes do with a single roller block, even if two adjacent primary mirrors, photovoltaic elements or other solar modules are to be guided together, uncoupled from one another. This result is achieved in that the connection shaft mounted on the roller block is produced in two parts that interact with one another, namely a tubular outer shaft, in the interior of which an inner shaft is accommodated. For this purpose, the inner shaft has a calotte element at its end that faces the outer shaft, preferably a calotte ball, which preferably also lies against the inner wall of the outer shaft. In this way, it is brought about that the inner shaft possesses a section having a lesser outside diameter than the inside diameter of the outer shaft, so that the inner shaft can be tilted in the outer shaft like in a ball joint. Furthermore, the inner shaft is mounted in the outer shaft in longitudinally displaceable manner, so that material contractions in the long rows of solar modules can be absorbed.

This design has the result that the outer side is mounted on the roller block in the same manner as, ultimately, also the inner shaft, because the inner shaft presses down on the same roller block, only with the interposition of the outer shaft. Therefore it is possible to do without a separate roller block also at those locations at which uncoupled guidance of adjacent solar modules is desired.

In detail, the roller block used in this regard can be formed from a trough profile, in which two adjacent rollers are situated between the shanks of the trough profile, which enclose a depression that is open toward the top and delimited by the outer surfaces of the rollers toward the bottom, to hold the connection shaft in captive manner. If necessary, the shanks of the trough profile can have a recess between the two rollers, so that the connection shaft does not lie on the shanks of the trough profile.

In a concrete embodiment, the calotte element can also be set up for a torque-proof connection of inner shaft and outer shaft, in that the calotte has one or more entrainment elements, preferably spatially limited elevations, which engage into counter-elements on the inner mantle of the outer shaft, for example depressions, or interact with these in some other way.

Alternatively, it can be provided that the calotte element is accommodated in the outer shaft so as to rotate freely. In other words, rotation between the outer shaft and the inner shaft is not hindered by resistances that go beyond normal material friction.

To connect the two-part connection shaft with the adjacent solar modules, connection plates can be provided at their free ends, to some advantage. These plates can be rigidly connected with the primary mirrors or photovoltaic elements, or with their housing boxes, respectively.

Furthermore, to particular advantage, placement of the rollers in the trough profile can be selected in such a manner that the rollers are disposed at the same height and that the rollers are of the same type, consequently made of the same material and in the same size. The spacing between the rollers is selected to be so small that the connection shaft cannot fall through between the rollers, but so great that the rollers do not touch one another.

Preferably, the axes of rotation of rollers and connection shaft form a unilateral triangle with one another, with the axis of rotation of the connection shaft as the upper tip. The outer circumference of the rollers can furthermore be selected to at least approximately correspond to the outer circumference of the outer shaft.

Furthermore, the outer contour of the rollers, in the axial direction, can be selected to be convex, so that the rollers are configured more or less in barrel shape. In this way, secure contact of the outer shaft is guaranteed even in the case of a slanted position of the outer shaft relative to the roller block.

In a preferred embodiment, the outer tube has an additional intermediate tube, which is inserted into the inner tube and fixed in place in it, if necessary, for example screwed on.

A holder for the calotte element is provided in the interior of the intermediate tube, in which the element is mounted in longitudinally displaceable and/or rotationally movable manner. The intermediate tube can preferably be produced from plastic.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
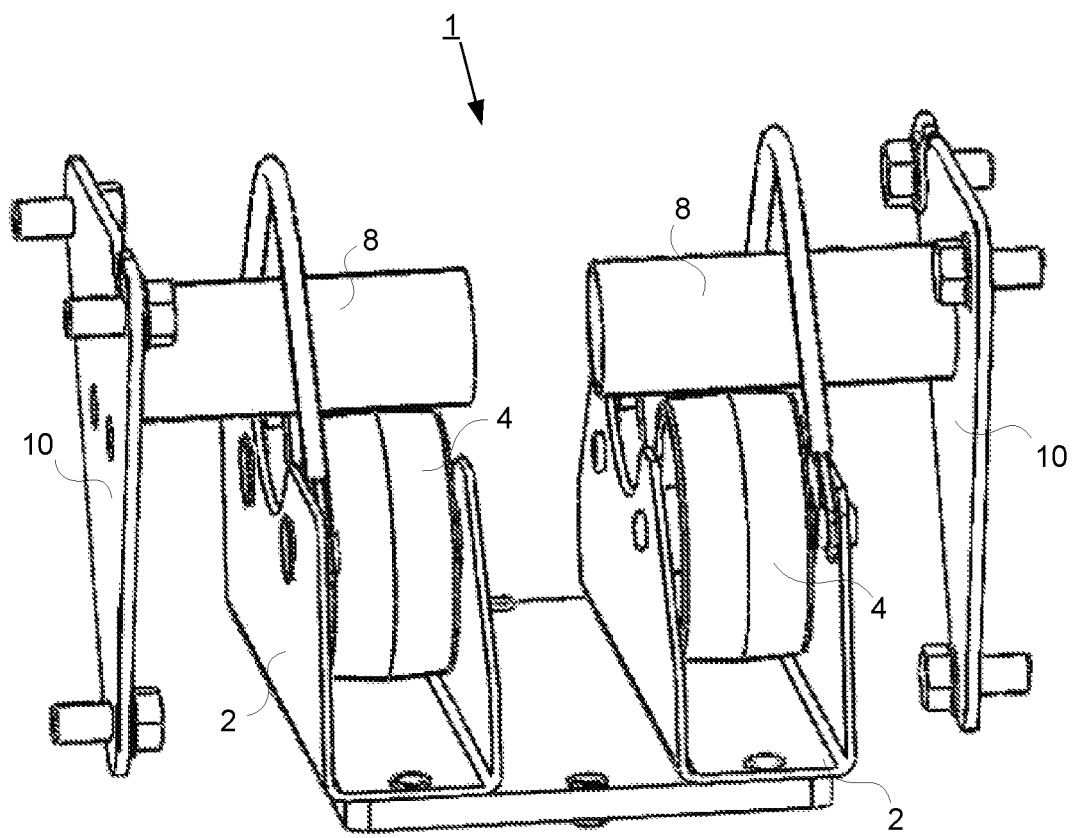
FIG. 1 shows a support for a solar module according to the state of the art, with two separate, adjacent roller blocks, in a perspective representation.

FIG. 1 shows a support 1 in a form known from the state of the art. In order to allow mounting of adjacent solar modules, for example primary mirrors or photovoltaic elements, two separate roller blocks 2 are used, which carry the incoming connection shafts 8 on two rollers 4, in each instance, independently of one another, in each instance. The primary mirrors, which are connected with the connection shafts 8 by way of connection plates 10, can track the position of the sun uncoupled from one another, in this regard. This tracking, however, requires a wider special construction, because only one roller block would be required in the case of a fixed connection shaft between the two solar modules.

Figure 2:
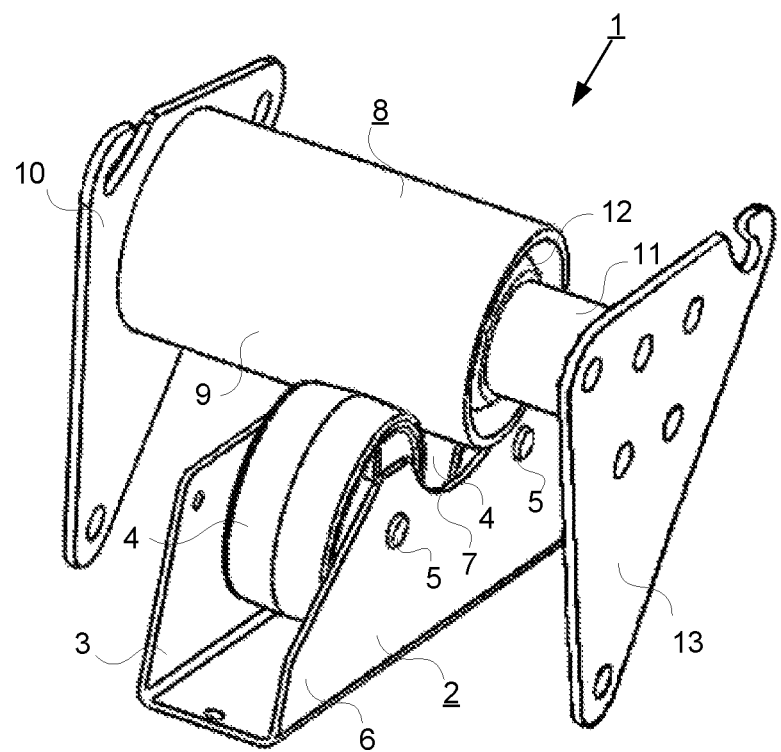
FIG. 2 shows a support according to the present invention, having a roller block and a two-part connection shaft, in a perspective representation.

In contrast, FIG. 2 shows a solution according to the invention, which provides only a single roller block 2. This block consists of a trough profile 3 having two upwardly projecting shanks 6, between which two adjacent rollers 4 having axes of rotation 5 are inserted.

In the region between the rollers 4, the shanks 6 have a recess 7 on both sides, so as to prevent contacting between connection shaft 8 and trough profile 3 of the roller block 2. A connection shaft 8 is laid into the depression spanned by the two rollers 4, which shaft is formed in two parts.

A first part, which lies on the outside, represents an outer shaft 9, which, at its free end, allows a connection plate 10 for a connection with the primary mirror located there. The tubular outer shaft 9 ends just after the roller block 2, and an inner shaft 11, which has a calotte element 12 in the end position and also a connection plate 13 at the opposite end, is pushed into the interior of the tubular outer shaft 9.

In this regard, the calotte element 12 lies against an intermediate tube inserted into the outer shaft, which intermediate tube allows a calotte holder for longitudinally displaceable, tiltable and/or freely rotational holding of the calotte element 12.

In this way, uncoupling between the inner shaft and the outer shaft is implemented. In this manner, not only can a change in length of the connection between the adjacent solar modules be compensated, but also, different guidance can take place.

What is described above is therefore a support for rotationally movable mounting of solar modules, preferably primary mirrors or photovoltaic elements, in a solar power plant, which represents a flexible but nevertheless simple solution for mounting of adjacent, independent solar modules. For this purpose, it is provided to configure an external axis as a tube and to mount an inner axis in the latter, by way of a calotte element in the end position, so that this element is accommodated in the outer shaft in longitudinally displaceable and tiltable manner, as well as freely rotational manner, if necessary. For this purpose, all that is required is one roller block, even if two uncoupled connection shafts are supposed to be mounted.

Although only at least one embodiment of the present invention has been shown and described, it is to be understood that many changes and modifications may be made thereunto without departing from the spirit and scope of the invention.

What is claimed is:

1. A support for rotationally movable mounting of solar modules in a solar power plant, the support comprising:
   (a) a roller block; and
   (b) a connection shaft mounted on the roller block for connecting adjacent first and second solar modules;
   wherein the connection shaft is formed in first and second parts and comprises a tubular outer shaft and an inner shaft having a calotte element in an end position; and
   wherein the calotte element is accommodated in the outer shaft in a tiltable and longitudinally displaceable manner.

2. The support according to claim 1, wherein the roller block has a trough profile comprising first and second shanks; wherein first and second rollers having parallel axes of rotation are disposed between the first and second shanks; and wherein the connection shaft is rotatably mounted between the first and second rollers and contacts both the first roller and the second roller.

3. The support according to claim 1, wherein the calotte element has entrainment elements that project outward, for torque-proof mounting in the outer shaft; and wherein the entrainment elements interact with counter-elements on an inner mantle of the outer shaft in a force-fit manner.

4. The support according to claim 1, wherein the calotte element is mounted in the outer shaft so as to rotate.

5. The support according to claim 1, wherein the inner shaft has a first connection plate assigned to a first end of the inner shaft and the outer shaft has a second plate assigned to a second end of the outer shaft opposite to the first end of the inner shaft; and wherein the first and second connection plates face away from one another for attachment to a solar module.

6. The support according to claim 2, wherein the first and second rollers are disposed in the trough profile in an identical manner and at an identical height.

7. The support according to claim 2, wherein the first and second rollers have an outer circumference at least approximately corresponding to an outer circumference of the outer shaft.

8. The support according to claim 2, wherein the first and second rollers have an outer contour convex in an axial direction.

9. The support according to claim 1, further comprising an intermediate tube interposed between the outer shaft and the calotte element, wherein the intermediate tube forms a calotte holder for at least one of tiltable accommodation and longitudinally displaceable accommodation of the calotte element.

10. The support according to claim 9, wherein the intermediate tube is produced from plastic.

* * * * *